Oct. 14, 1941.  J. L. HARRIS  2,259,343
MOTOR CONTROL SYSTEM
Filed March 29, 1940  2 Sheets-Sheet 2

Inventor
John L. Harris
By George H. Fisher
Attorney

Patented Oct. 14, 1941

2,259,343

UNITED STATES PATENT OFFICE 2,259,343

MOTOR CONTROL SYSTEM

John L. Harris, Minneapolis, Minn., assignor to Minneapolis-Honeywell Regulator Company, Minneapolis, Minn., a corporation of Delaware Application March 29, 1940, Serial No. 326,688

14 Claims. (Cl. 172—239)

The present invention relates to a motor control system and more particularly to one employing a relatively sensitive relay.

In numerous motor control systems, particularly of the type wherein the motor is controlled from a remote point, it is customary to employ a relatively sensitive relay. Particularly in the case where the energization of this relay is gradually varied to vary the position thereof, difficulty arises that when the control contacts are first engaged the contact pressure is inadequate to carry the motor current. It is accordingly quite common to employ booster means in connection with such relays. Where the relay is an electrically operated relay, such booster means may take the form of additional booster coils or means for additionally varying the current through the main relay coils upon the relay contacts being engaged. The use of such a booster means has the disadvantage, particularly in remote control systems of the proportioning type, that the sensitivity of the system is materially decreased. It will be obvious that after a booster force is applied, a considerable change in the energization of the relay is necessary before the relay will change its circuit controlling position.

An object of the present invention is to provide a motor controlling system employing a relay wherein upon the relay moving to motor operating position it is more firmly urged into such position by booster means and in which provision is made for periodically decreasing such booster action. In one embodiment of the invention, this is accomplished by removing or decreasing the booster force. In another modification this is accomplished by applying a further force opposing the booster force.

A further object of the present invention is to provide such an arrangement wherein the booster force is only momentarily removed.

A further object of the present invention is to provide such an arrangement in which it is impossible for the motor to stop in any position wherein the booster force is not applied to the relay upon the initiation of a new operating cycle.

A further object of the present invention is to provide such an arrangement wherein application of the booster force is accomplished by changing the energization of the relay and wherein a snap switch operated by the motor is effective to periodically decrease this booster force.

A further object of the present invention is to provide a motor control system wherein the booster action is decreased upon the motor operation being initiated and wherein the motor is periodically operated independently of the relay.

Other objects of the invention will be apparent from a consideration of the accompanying specification, claims and drawings, of which Figure 1 is a schematic view of one species of the improved motor control system;

Figure 1:
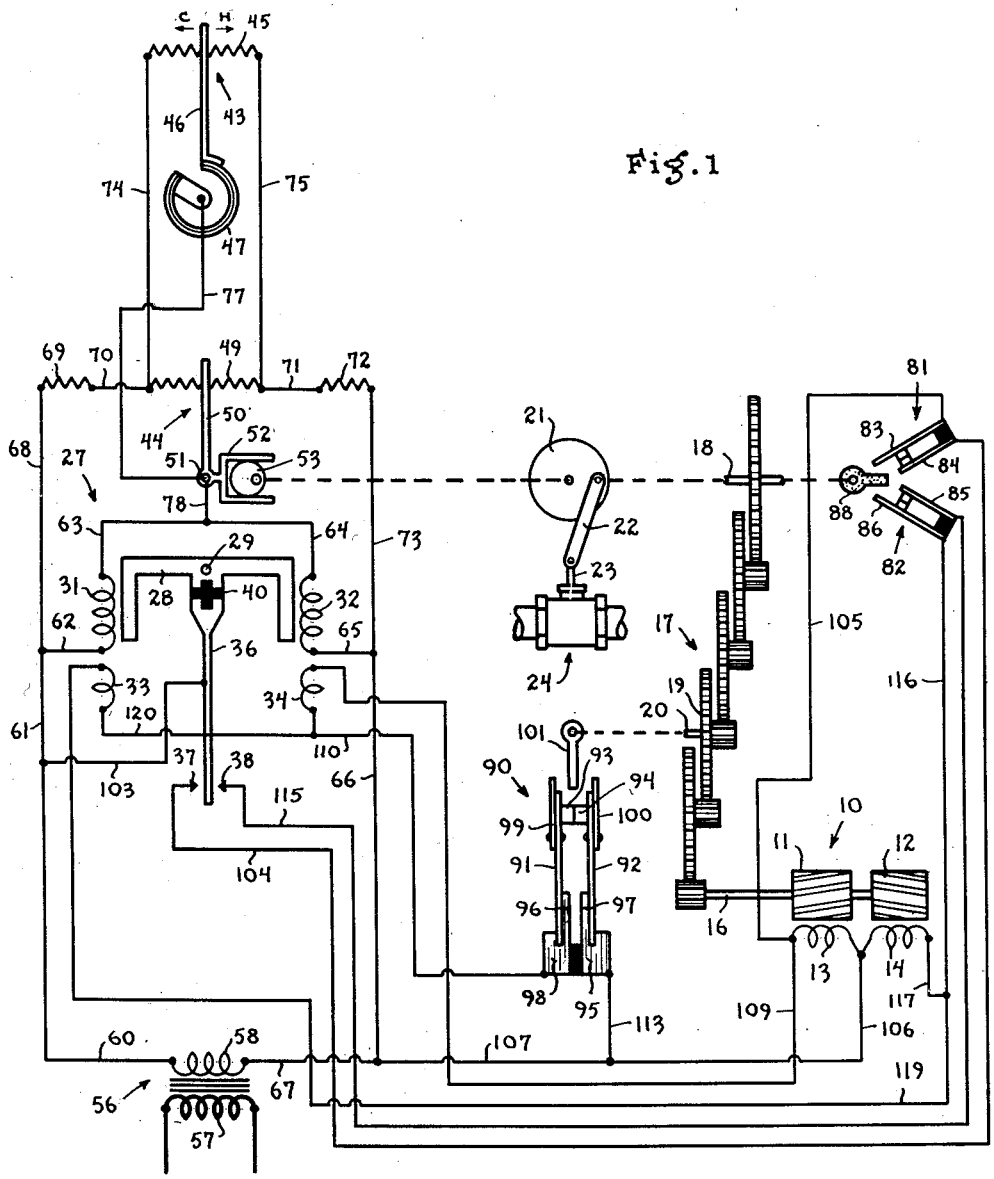

Referring to the drawings for a more detailed understanding of the invention, the invention is shown in Figure 1 in connection with the control of a motor 10. This motor is illustrated as being of the reversible induction type having two rotors 11 and 12. Associated with the rotors 11 and 12 are field windings 13 and 14, respectively. It is to be understood that when field winding 13 is energized the motor is operated in one direction, and when field winding 14 is energized the motor is operated in the other direction. The rotors 11 and 12 are secured to a shaft 16 which is connected through a reduction gear train 17 to a shaft 18. Included in the reduction gear train 17 is an intermediate gear 19 secured to a shaft 20. The shaft 18 has secured thereto a crank disc 21 which is connected through a link 22 to the valve stem 23 of a valve 24. Upon counter-clockwise rotation of shaft 18 and crank disc 21, the valve stem 23 is moved upwardly to move the valve 24 to open position. Similarly, upon the opposite rotation of shaft 18, the valve 24 will be moved to closed position. Where the motor system is employed in connection with a temperature regulating system, the valve 24 may well regulate the flow of a temperature changing fluid such as steam through a pipe leading to radiators or other similar devices.

A relay 27 controls the energization of motor 10. This relay is of the balanced type comprising a U-shaped armature member 28 pivotally mounted at 29. The armature member has two downwardly extending legs which cooperate with coils 31 and 32. Associated with the relays 21 and 22 are booster coils 33 and 34. Secured to the armature 28 is a switch blade 36 which is adapted to selectively engage fixed contacts 37 and 38. The switch blade 36 is secured to armature 28 by an insulated connection 40 of any suitable form. The position of armature 28 and switch blade 36 is determined by the relative energizations of relay coils 31 and 32, the action of these relay coils being affected by booster coils 33 and 34. Disregarding the booster coils, the relay switch blade 36 is in the position shown when relay coils 31 and 32 are equally energized. Upon relay coil 31 becoming more highly energized than relay coil 32, switch blade 36 is moved into engagement with contact 38. When, on the other hand, relay coil 32 becomes more highly energized than relay coil 31, the switch blade 36 is moved into engagement with contact 37.

The relative energization of relay coils 31 and 32 is controlled by a pair of potentiometers 43 and 44. Potentiometer 43 constitutes the main control potentiometer and comprises a resistance element 45 over which moves a contact arm 46. The contact arm 46 is secured to a bimetallic element 47 which variably positions the arm 46 in accordance with the temperature to which bimetallic element 47 is subjected. As indicated by legends C and H on the drawing, the bimetallic element is effective to move contact arm 46 to the left upon a temperature fall and to the right upon a temperature rise. It is to be understood that the particular means for actuating contact arm 46 is of no particular importance so far as the present invention is concerned. The invention, however, is particularly applicable to a device such as a thermostatically operated potentiometer where the controlling force is necessarily relatively small.

The potentiometer 44 constitutes a rebalancing or follow-up potentiometer. This potentiometer comprises a resistance element 49 over which moves a contact arm 50. Contact arm 50 is pivotally mounted at 51 and has secured thereto a yoke 52. Disposed between the two arms of the yoke 52 is a cam 53 driven by the shaft 18. It will be obvious that upon rotation of the shaft 18 in a clockwise direction, the contact arm 50 is moved to the left and upon a rotation of the shaft 18 in a counter-clockwise direction, the contact arm 50 is moved to the right. It will thus be observed that upon the position of valve 24 being varied, the position of contact arm 50 is similarly varied.

Power for operation of the system is supplied by a step-down transformer 56. This transformer comprises a line voltage primary 57 and a low voltage secondary 58. The primary winding 57 is connected to a suitable source of power (not shown).

The potentiometers 43 and 44 are connected in parallel with the relay coils 31 and 32 to the secondary 58. Thus relay coils 31 and 32 are connected in series across the secondary winding 58 as follows: from the left-hand terminal of secondary 58 through conductors 60, 61 and 62, relay coil 31, conductors 63 and 64, relay coil 32, and conductors 65, 66 and 67 to the other terminal of secondary 58. The resistance element 49 of potentiometer 44 is connected across relay coil 58 as follows: from the left-hand terminal of secondary 58 through conductors 60, 61 and 68, protective resistor 69, conductor 70, resistance element 49, conductor 71, protective resistor 72, and conductors 73, 66 and 67 to the other terminal of secondary 58. The resistance element 45 of control potentiometer 43 is connected across the secondary 58 as follows: from the left-hand terminal of secondary 58 through conductors 60, 61 and 68, protective resistor 69, conductors 70 and 74, resistance element 45, conductors 75 and 71, protective resistance element 72, and conductors 73, 66 and 67 to the other terminal of secondary 58. The contact arms 46 and 50 are both connected to the junction of relay coils 31 and 32. Contact arm 43 is connected as follows: bimetallic element 47, conductors 77 and 78 to the junction of conductors 63 and 64. Contact arm 50 is connected by the conductor 78 to the same junction.

It will be observed from the connections traced in the above paragraphs that the potentiometers 43 and 44 are connected in parallel with relay coils 31 and 32 and act as voltage dividers. Thus upon contact arm 43 being moved to the left as happens in connection with a temperature fall, the voltage across relay coil 32 is increased thereby unbalancing the energization of the relay and causing switch blade 36 to move into engagement with contact 37. Upon contact arm 46 moving to the right, the opposite action takes place. In other words, the energization of the relay coil 31 is increased and that of the relay coil 32 decreased. The rebalancing potentiometer 50 has a similar effect upon the relative energization of relay coils 31 and 32. It will be apparent that for a given movement of contact arm 46 in one direction, the effect upon the energization of relay coils 31 and 32 can be overcome by an equivalent movement of contact arm 50 in the opposite direction. The apparatus is so designed that upon the energization of relay coils 31 and 32 being unbalanced by a movement of contact arm 46 in either direction, the motor is operated in such a direction as to move contact arm 50 in the opposite direction to rebalance the system. In this manner, the motor is at all times operated to position the valve 24 in accordance with the position of contact arm 46. This operation will be more fully set out in connection with the description of the operation of the system as a whole.

In tracing the above connections, reference was made to the protective resistors 69 and 72. The purpose of these resistors is to prevent a condition wherein the secondary 58 would be completely short circuited. Inasmuch as a movement of contact arm 46 in one direction causes an operation of the motor such as to move contact arm 50 in the opposite direction, a condition can arise wherein the arms 46 and 50 are in extreme opposite positions. Thus when contact arm 50 is in its extreme left position and contact arm 46 in its extreme right position, if it were not for resistors 69 and 72, the secondary 58 would be short circuited as follows: from secondary 58 through conductors 60, 61, 68, and 70, contact arm 50, conductor 77, bimetallic element 47, contact arm 46, and conductors 75, 71, 73, 66, and 67 to the other terminal of secondary 58.

Limit switches 81 and 82 are provided to limit the movement of the motor. The limit switch 81 comprises a long resilient contact blade 83 and a relatively short rigid contact arm 84. Similarly, limit switch 82 comprises a long resilient contact blade 86 and a short rigid contact blade 85. An arm 88 of insulating material is secured to the shaft 18 and is adapted to engage the ends of the switch blades 83 and 86 upon rotation of the shaft 18 to positions corresponding to the desired extreme positions of movement of the valve. Thus when the shaft 18 is revolved in valve opening direction, the arm 88 will engage the switch blade 83 upon the valve approaching open position. Similarly, during closing movement of the valve, the arm 88 will engage the switch blade 86 at a predetermined minimum flow position. Upon arm 88 engaging either of switch blades 83 or 86, the respective limit switches open to terminate energization of the motor.

A switch 90 controls the energization of the booster coils 33 and 34. This switch comprises two yieldable switch blades 91 and 92 which carry contacts 93 and 94, respectively. Switch blades 91 and 92 are secured in blocks 98 and 95. The blocks 98 and 95 have portions 96 and 97 projecting upwardly adjacent the inner faces of switch blades 91 and 92. The purpose of the upwardly projecting portions 96 and 97 is to limit the movement of switch blades 91 and 92 toward each other. In other words, by reason of these upwardly projecting portions 96 and 97, the switch blades 91 and 92 move more freely outwardly than inwardly. Secured to the outer surface of the upper end of switch blade 91 is a resilient blade 99. A similar resilient blade 100 is secured to the upper end of switch blade 92. A crank arm 101 is secured to shaft 20 and is adapted to cooperate with the resilient blades 99 and 100. It will be apparent that the resilient blades 99 and 100 readily flex outwardly inasmuch as they are secured to blades 91 and 92 at their lower ends. The resiliency of the blades 99 and 100 is much less than that of switch blades 91 and 92 so that upon the crank arm 101 engaging the inner surface of either of the blades 99 and 100, the associated switch blade is not moved. Upon the crank arm 101 engaging the outer surface of the leaf springs however, the associated switch blade 91 is moved. Thus in the case in which the shaft 20 is revolved in a clockwise direction from the position shown, arm 101 flexes the blade 99 and does not disturb the position of contacts 93 and 94 until it has revolved through almost a complete cycle and engages the outer surface of the blade 100. A further counter-clockwise movement of the crank arm 101 results in switch blade 92 being moved to the left and inasmuch as contacts 93 and 94 are in abutting engagement, the motion of switch blade 92 will be transmitted to switch blade 91. As soon as arm 101 has moved over the end of blade 100, the two switch blades 91 and 92 will be free to travel back. The movement of switch blade 91 will be relatively limited, however, due to its engagement with the upstanding portion 96 of block 98. The movement of switch blade 92 on the other hand, will not be so restricted so that this switch blade 92 will swing considerably more to the right than will switch blade 91. The result will be that contacts 93 and 94 will be momentarily separated. Upon the return movement of switch blade 92, contacts 93 and 94 will be reengaged. The action which thus results each time that contact arm 101 revolves through a complete cycle is that contacts 93 and 94 are momentarily separated. It is to be noted that as soon as a condition has been created whereby switch blades 93 and 94 will be separated, it is assured that these contacts will be reengaged. It is thus impossible for the motor to stop at any position wherein contacts 93 and 94 will remain separated. Upon contact arm 101 revolving in the opposite direction, that is in a counter-clockwise direction, the arm 101 will engage resilient blade 99 to move both switch blades 91 and 92 to the right. When the contact arm 101 clears the blade 99, the two switch blades will move back to the left. In this case, the movement of switch blade 92 is limited by the upstanding portion 97 while the movement of switch blade 91 is not so limited. Again, a momentary separation of contacts 93 and 94 will take place. As in the case in which crank arm 101 rotates in a clockwise direction, it is impossible to create a condition wherein contacts 93 and 94 are left in a disengaged position.

*Operation*

The various elements are shown in the drawing in the position occupied when the valve 24 is in an intermediate position. Thus in the illustrated application of the invention to the temperature control art, the positions are those occupied in which the temperature is at the desired value and the flow of heating fluid through valve 24 is substantially that required to maintain such a temperature. Let it now be assumed that the temperature does fall so as to cause contact arm 43 to be moved to the left. From the preceding description it will be obvious that this causes relay coil 32 to become more highly energized than relay coil 31, thereby moving switch blade 36 into engagement with contact 37. Upon such engagement taking place, the following circuit is established to the field winding 13 of motor 10: from the left-hand terminal of secondary 58 through conductors 60 and 103, contact arm 36, contact 37, conductor 104, limit switch 81, conductor 105, field winding 13, and conductors 106, 107 and 67 back to the secondary 58.

The motor is so designed that upon field winding 13 being energized, the motor is rotated in such a direction as to cause counter-clockwise movement of the shaft 18 and clockwise movement of the shaft 20. The counter-clockwise movement of the shaft 18 results in a similar movement of the crank disc 21 and resultant movement of the valve 24 towards open position. At the same time, the counter-clockwise rotation of the shaft 18 causes the contact arm 50 to be moved to the right which is in the direction opposite to the original movement of the contact arm 46 that caused the unbalance in the energization of the relay. It will be obvious that after the motion has continued sufficiently far, the movement of the contact arm 50 to the right will result in the relay being rebalanced.

Disregarding the effect of the relay coils 33 and 34, as soon as the relay coils 31 and 32 are again equally energized, the relay will move to the neutral position and terminate the energization of the field winding 13. The motor will thus have moved the valve an amount proportional to the movement of contact arm 46. Where the system is employed in connection with temperature control, this will result in an increased flow of heating fluid in accordance with the decrease in temperature in the space in which the bimetallic element 47 is located.

The action which has just been described is that which would take place if the booster coils 33 and 34 were not present. Upon switch blade 36 engaging the contact 37 in the manner previously described, an energizing circuit is not only established to the field winding 13 but is also established to the booster coil 34 as follows: from the secondary 58 through conductors 60 and 103, blade 36, contact 37, conductor 104, limit switch 81, conductors 105 and 109, booster winding 34, conductor 110, block 98, switch blade 91, contacts 93 and 94, switch blade 92, block 95, and conductors 113, 107 and 67 to the other terminal of secondary 58. The energization of the booster winding 34 as the result of the establishment of the above circuit instantly results in a force aiding that exerted by winding 32 so that the switch blade 36 is moved more firmly into engagement with the contact 37. This action is highly desirable since it assures that switch blade 36 will be firmly engaged with the contact 37 during the energization of the motor 10. Sparking between the switch blade 36 and the contact 37 is thus eliminated. The disadvantage of the booster coil 34, however, is, as pointed out above, that the operation of the motor is not terminated until the energization of the relay coil 31 has increased to the point where it exerts a force equal to that exerted by both coils 32 and 34. As soon as this condition is attained, the switch blade 36 is separated from the contact 37 thereby deenergizing the booster coil 34. This results in the relay coil 31 now being more highly energized than the relay coil 32 and tending to cause the switch blade 36 to move into engagement with the contact 38. It will be readily apparent that the provision of the booster coil 34 thus necessitates a wider operating differential for the relay. If the relay is not provided with a relatively wide operating differential, the motor will continue to operate in first one direction and then another due to the unbalance effect introduced by the booster coil. Where a relay is provided with a wide differential as is usually the case, the available number of positions is materially decreased.

As indicated in an earlier portion of the specification, the present invention is particularly concerned with periodically decreasing or removing the booster effect so that the relay is subjected only to the forces exerted by the regular control means. It will be recalled that upon the shaft 18 being revolved in a counter-clockwise direction, the shaft 20 is revolved in a clockwise direction. As previously described, this results in the switch blades 91 and 92 both being moved to the left and then being released to move back towards the right by reason of their inherent resiliency. The switch blade 92 will be free to move further than the switch blade 91 so that the contacts 93 and 94 will be momentarily separated. This momentary separation of the contacts 93 and 94 will occur during each revolution of the shaft 20. Since shaft 20 is connected in an intermediate point of the gear train, this shaft will revolve at a relatively high rate of speed as compared with the shaft 18 so that the contacts 93 and 94 will be separated at relatively frequent intervals. Each time that the contacts 93 and 94 are separated, the circuit previously traced through the booster coil 34 is interrupted. If the movement of the contact arm 50 at any one of these intervals at which contacts 93 and 94 are separated has been sufficient to rebalance the energization of the coils 31 and 32, the relay switch blade 36 will separate from the contact 37, thereby terminating further movement of the motor. Thus the operation of the motor will be terminated upon a rebalance of energization of the coils 31 and 32 and will not be continued until the force exerted by the relay coil 31 is equal to that exerted by both relay coils 32 and 34. The relay can thus be provided with a much narrower differential and much more sensitive operation of the system can be obtained.

The operation which has just been described is that which occurs when the contact arm 46 has moved to the left. Let it be assumed that the temperature rises so that the contact arm 46 is moved to the right. This will cause the relay coil 31 to become more highly energized than the relay coil 32 so that the switch blade 36 is moved into engagement with the contact 38. Upon this taking place, a circuit is established to the motor field winding 14 as follows: from the left-hand terminal of the secondary 58 through conductors 60 and 103, switch arm 36, contact 38, conductor 115, limit switch 82, conductors 116 and 117, field winding 14, and conductors 106, 107 and 67 to the other terminal of secondary 58. The energization of the field winding 14 will cause the motor 10 to revolve in the opposite direction so as to cause clockwise movement of the shaft 18 and crank disc 21. This will cause movement of the valve 24 towards closed position and a movement of the contact arm 50 to the left. At the same time, the shaft 20 will be rotated in a counter-clockwise direction. Simultaneously with the energization of the field winding 14, the booster winding 33 is energized by a circuit as follows: from the left-hand terminal of secondary 58 through conductors 60 and 103, switch blade 36, contact 38, conductor 115, limit switch 82, conductors 116 and 119, booster coil 33, conductors 120 and 110, block 98, switch blade 91, contacts 93 and 94, switch blade 92, block 95, and conductors 113, 107 and 67 to the other terminal of secondary 58. The energization of the booster coil 33 results in a booster force aiding that of the winding 31 so as to move the switch blade 36 more firmly into engagement with the contact 38. A firm engagement of the switch blade 36 with the contact 38 is thus effected in order to eliminate any possibility of sparking between the switch blade and the contact 38.

As pointed out previously, the shaft 20 is now rotated in a counter-clockwise direction. Each time that the contact arm 101 engages the leaf spring 99, the switch blades 91 and 92 are moved to the right as previously described. Upon being released, the two switch blades move to the left but the movement of the switch blade 92 is restricted by the upstanding shoulder 97 whereas the movement of the switch blade 91 is not so restricted. The result is that the contacts 93 and 94 are momentarily separated. Such momentary separation of the contacts 93 and 94 occurs each time that the crank arm 101 makes a complete revolution. Each time that the contacts 93 and 94 are so separated, the booster coil 33 is deenergized so that the position of the switch blade 36 is determined entirely by the relative energization of the relay coils 31 and 32. Thus each time that these contacts 93 and 94 are separated, an opportunity is afforded the relay to rebalance itself if the position of the contact arm 50 corresponds to the position of the contact arm 46.

A very important feature of the present invention is that the contacts 93 and 94 are separated by the mechanism driven by the motor. This results in an extremely simple system while at the same time provision is made for securing adequate contact pressure between the contacts 93 and 94. As pointed out previously, it is a particularly important feature of the invention that the contacts 93 and 94 are never separated more than momentarily and that it is impossible for the motor to be stopped at any position wherein the contacts 93 and 94 are maintained out of engagement.

Figure 2:
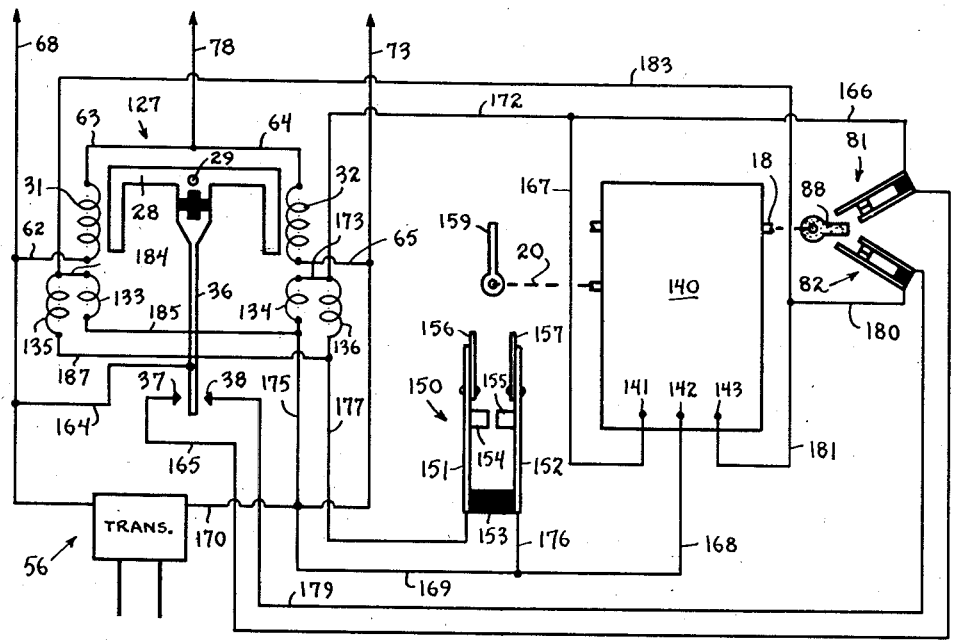
Figure 2 is a schematic view of a portion of a modified system.

*Species of Figure 2*

In the species of Figure 1, the periodic decrease in booster action is accomplished by deenergization of the booster coil. In the species of Figure 2, this decrease in booster action is accomplished by the energization of a separate booster coil which opposes a first booster coil.

Inasmuch as certain elements of the system of Figure 2 are identical to those of Figure 1, only a portion of the complete system is shown in Figure 2, and certain elements shown in greater detail in Figure 1 are shown in schematic form in Figure 2. In order to more clearly bring out the analogy between the two systems, certain elements of Figure 2 which are identical to the system of Figure 1 have had similar reference characters applied thereto. Thus the relay 127 is shown as comprising an armature 28 and a switch blade 36 which cooperates with contacts 37 and 38. The armature has cooperating therewith two main relay coils 31 and 32, the relative energization of which is controlled by rebalancing potentiometers as in Figure 1. The conductors 62, 68, 69, 65, and 73 are identical to the same conductors in Figure 1 and lead to the same elements. Associated with the relay coils 31 and 32 are booster coils 133 and 134. The action of the booster coils 133 and 134 is opposed by auxiliary coils 135 and 136. Thus the booster coil 133 aids the coil 31 and is opposed by coil 135. Similarly, the coil 134 when energized aids the coil 32 and is opposed by the coil 136 when the relay is energized. The auxiliary coils 135 and 136, may, if desired, be so formed as to exert a slightly greater force than their associated booster coils 133 and 134 so that when either auxiliary coil is energized, it not only neutralizes the effect of the booster coil but introduces a slight additional force tending to move the relay back to its balanced position. This is desirable since a relay of this type tends to have a slight amount of inertia.

In order to simplify the showing, the motor 10 and gear train 17 are shown within a box 140. Projecting from this box are the shafts 18 and 20. The box 140 is provided with three terminals 141, 142 and 143. The terminal 142 is the terminal common to field windings 13 and 14, while terminal 141 is connected to the field winding 13 and the terminal 143 to field winding 14.

A switch 150 is provided for controlling the energization of the auxiliary windings 135 and 136. This switch comprises a pair of resilient switch blades 151 and 152 secured to an insulating block 153. The switch blades 151 and 152 carry contacts 154 and 155, these contacts normally being out of engagement. Secured to switch blades 151 and 152 are relatively thin resilient blades 156 and 157. The blades 156 and 157 are adjacent the blades 151 and 152 for the greater portion of the length of the blades 156 and 157. The blades 156 and 157 are secured to the inner sides of the blades 151 and 152 so that they are free to flex inwardly but cannot readily flex outwardly. A crank arm 159 is secured to the shaft 20 and cooperates with the blades 156 and 157. Upon crank arm 159 engaging either blade 156 or 157 by moving inwardly, the blade 156 or 157, as the case may be, freely flexes. However, when the arm 159 engages the blade 156 or 157 in moving outwardly, the corresponding switch blade 151 or 152 is moved therewith. Thus upon the crank arm 159 revolving in a clockwise direction, the crank arm 159 first engages the switch blade 157 which is freely flexed permitting the crank arm 159 to ride thereover without affecting the position of the switch blade 152. Upon further movement of the crank arm 159, it engages the inner surface of the upper end of the blade 156 causing the switch blade 159 to be moved outwardly to the left. This movement will continue until the crank arm 159 passes over the upper end of the blade 156 permitting the switch blade 151 to return to the right by reason of its inherent resiliency. Upon returning to the right, contacts 154 and 155 will be momentarily moved into engagement and then separated. It will be noted that when the switch blades 151 and 152 are in such condition as to permit engagement of the contacts 154 and 155, it is impossible for these two contacts to remain in engagement. A similar action will take place when the crank arm 159 is revolving in a counter-clockwise direction. In this case, the crank arm will flex the blade 156 so as not to affect the switch blade 151. Thereafter, the switch blade 152 will be moved to the right until crank arm 159 passes over the end of the blade 157. The switch blade 152 is then able to spring back to the left carrying contact 155 into engagement with the contact 154. This engagement again is a momentary one, and it is impossible for the apparatus to assume any position wherein engagement of the contacts 154 and 155 is continuously maintained.

*Operation of species of Figure 2*

As in the case of the species of Figure 1, the various elements of Figure 2 are shown in the position occupied when the relay is balanced and motor 140 is not being operated. Let it now be assumed that the temperature drops so as to cause the relay coil 32 to become more highly energized than the relay coil 31 as described in connection with Figure 1. This will cause switch blade 36 to be moved into engagement with contact 37 so that an energizing circuit will be established to motor 140 as follows: from the left-hand terminal of transformer 56 through conductor 164, switch blade 36, contact 37, conductor 165, limit switch 81, conductors 166 and 167, motor terminal 141, motor 140, motor terminal 142, conductors 168, 169 and 170 to the right-hand terminal of transformer 56. The establishment of this circuit, as in the case of Figure 1, will cause the motor to rotate in a direction to move the valve towards open position to move the shaft 18 in a counter-clockwise direction and the shaft 20 in a clockwise direction.

At the same time as the above traced circuit to motor 140 is established, a circuit is established to the booster coil 134 as follows: from the right-hand terminal of transformer 56 through conductor 164, switch arm 36, contact 37, conductor 165, limit switch 81, conductors 166, 172 and 173, booster coil 134, and conductors 175 and 170 to the other terminal of transformer 56. The energization of the booster coil 134 produces a force aiding that exerted by the relay coil 32 so that the switch blade 36 is more firmly pressed into engagement with contact 37.

The revolution of the shaft 20 in a clockwise direction causes the arm 159 to periodically engage the resilient blade 156. As previously described, upon the inner surface of this blade being engaged by arm 159, the blade 151 is moved outwardly and allowed to spring back momentarily so as to effect engagement of the contacts 154 and 155. Such engagement of the contacts 154 and 155 thus occurs during each revolution of the arm 159. Each time that the contacts are so engaged, a circuit is established to the bucking coil 136 as follows: from the left-hand terminal of the transformer 56 through conductor 164, switch blade 36, contact 37, conductor 165, limit switch 81, conductors 166 and 172, bucking coil 136, conductor 177, switch blade 151, contacts 154 and 155, switch blade 152, and conductors 176, 169 and 170 to the other terminal of the transformer 56. As previously explained, the bucking coil opposes the booster coil 134. Thus each time that contacts 154 and 155 are moved into engagement, the booster effect is counteracted. One advantage of the present arrangement is that it is possible to decrease the booster action any desired amount by properly proportioning the booster and bucking coils. As previously explained, the bucking coils may be designed so as to have a greater effect than the booster coils. In this case, the energization of the booster coil 136 not only completely counteracts the effect of booster coil 134 but also introduces a slight force tending to rebalance the relay and thus overcome any inertia in the movable portions of the relay.

When the relay is unbalanced in the opposite direction as a result of the temperature rise, or in other words when relay coil 31 is more highly energized than the relay coil 32, the switch blade 36 is moved into engagement with the contact 38 and the following circuit is established to the motor 140: from the left-hand terminal of transformer 56, through conductor 164, switch blade 36, contact 38, conductor 179, limit switch 82, conductors 180 and 181, motor terminal 143, motor 140, motor terminal 142, and conductors 168, 169 and 170 to the other terminal of the transformer 56. The establishment of this circuit causes the motor to rotate in a direction opposite to that previously discussed so that the shaft 18 is rotated in a clockwise direction and the shaft 20 in a counter-clockwise direction.

When the relay is unbalanced in the manner just described, an energizing circuit is established to the booster coil 133 as follows: from the left-hand terminal of transformer 56 through conductor 164, switch blade 36, contact 38, conductor 179, limit switch 82, conductors 180, 183 and 184, booster coil 133, conductors 185, 175 and 170 to the other terminal of transformer 56. The counter-clockwise rotation of the shaft 20 causes the crank arm 159 to periodically engage the inner surface of the blade 157 so as to cause the contacts 154 and 155 to be momentarily snapped into engagement. Each time that such momentary engagement occurs, a circuit is established to the booster coil 135 as follows: from the left-hand terminal of transformer 56 through conductor 164, switch blade 36, contact 38, conductor 179, limit switch 82, conductors 180 and 183, bucking coil 135, conductors 187 and 177, switch blade 151, contacts 154 and 155, blade 152, and conductors 176, 169 and 170 to the other terminal of transformer 56. Each time that the bucking coil 135 is energized, the booster action of booster coil 133 is neutralized and a slight opposing force is introduced. Thus again, the booster effect is periodically eliminated and the relay is periodically subjected momentarily to a force tending to rebalance it.

It will be noted that the circuits to both the booster and bucking coils are controlled by switch blade 36 and its associated contacts. Thus, as soon as the relay is rebalanced, the bucking and booster coils are both deenergized.

Figure 3:
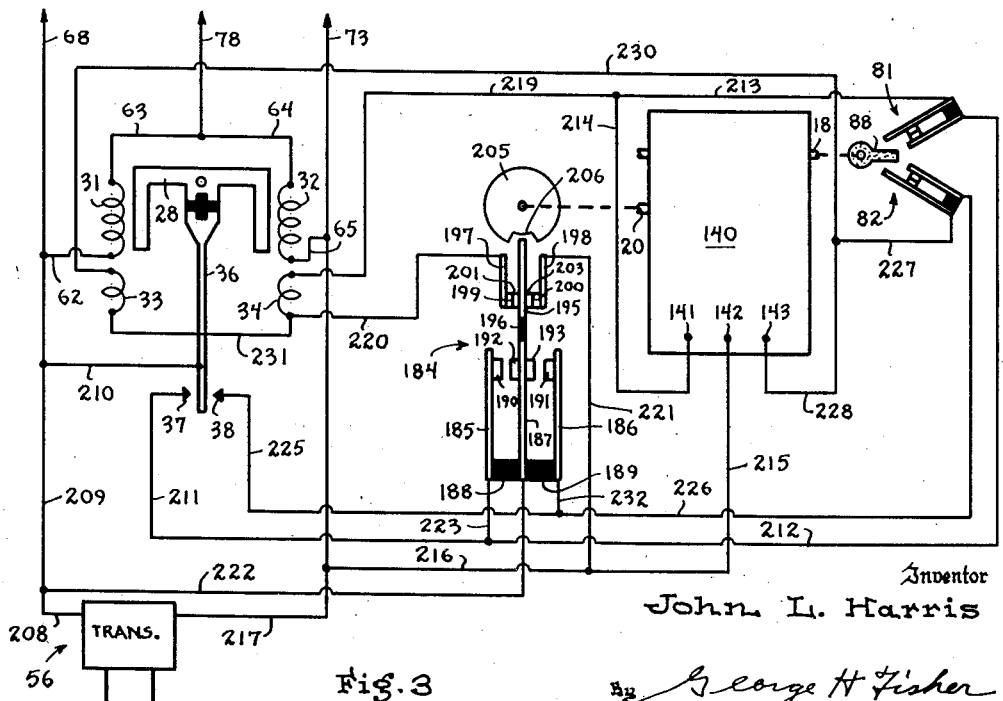
Figure 3 is a schematic view of a portion of another modification of the system.

*Species of Figure 3*

In the modification of Figure 3, the booster coil is deenergized immediately after the motor is placed in operation. In order to guard against sparking and other disadvantages resulting from insecure engagement of the relay contacts, provision is made for periodically energizing the motor through a maintaining circuit independent of the relay contacts. As in the case of Figure 2, only a portion of the complete system is shown and the various elements which are identical to the elements of Figure 1 have the same reference numerals applied thereto. As in Figure 2, the entire motor assembly including the motor and gear train has been shown enclosed in a casing and is designated by the reference numeral 140. A switching mechanism designated by the numeral 184 is employed to periodically establish the maintaining circuit to the motor and to deenergize the booster coil. This switch assembly comprises two rigid switch blades 185 and 186 and a yieldable switch blade 187. These three blades are separated by insulating blocks 188 and 189. Switch blades 185 and 186 carry contacts 190 and 191 which are adapted to engage contacts 192 and 193, respectively, carried by the switch blade 187. The switch blade 187 has an extended portion 195 separated from the main portion by an insulated connection 196. The extended portion 195 is adapted to cooperate with two flexible switch blades 197 and 198. Switch blades 197 and 198 carry contacts 199 and 200 which are adapted to cooperate with contacts 201 and 203, respectively, carried by the extended portion 195 of the switch blade 187. The extended portion 195 of the switch blade 187 is adapted to cooperate with a cam 205 secured to the shaft 20. The cam 205 has a notched portion 206. When the notched portion 206 is adjacent the extended portion 195, the switch blade 187 occupies the neutral position shown in the drawing. Upon rotation of the cam in either direction, the switch blade 187 is correspondingly moved so as to move one or the other of its contacts 192 and 193 into engagement with the associated contacts of the switch blades 185 and 186. At the same time, one or the other of the flexible blades 197 and 198 is moved so as to cause interruption of the circuit including contacts 199, 201, 203 and 200. Thus when the cam 205 rotates in a clockwise direction, the switch blade 187 is moved to the left. This causes engagement of the contacts 190 and 192. At the same time, the extended portion 195 is moved sufficiently to the left to separate contacts 203 and 200. If on the other hand, the cam 205 is rotated in a counter-clockwise direction, contacts 193 and 191 are moved into engagement and contacts 199 and 200 are separated.

*Operation of species of Figure 3*

As in the preceding species, the various elements are shown in the positions assumed when the relay is balanced and when the temperature is at substantially the desired value. Let it be assumed that the temperature changes so as to cause the relay coil 32 to be more highly energized than the relay coil 31. Under these conditions, switch blade 36 will be moved into engagement with the contact 37 and the following circuit will be established to the motor 140: from the left-hand terminal of transformer 56 through conductors 208, 209 and 210, switch blade 36, contact 37, conductors 211 and 212, limit switch 81, conductors 213 and 214, motor terminal 141, motor 140, motor terminal 142, and conductors 215, 216 and 217. The establishment of this circuit causes the shaft 18 to revolve in a counter-clockwise direction to move the valve towards open position, as previously described. At the same time, the shaft 20 is revolved in a clockwise direction.

The engagement of the switch blade 36 with the contact 37 also established the following energizing circuit to the booster coil 34: from the left-hand terminal of transformer 56, through conductors 208, 209 and 210, switch blade 36, contact 37, conductors 211 and 212, limit switch 81, conductors 213 and 219, booster coil 34, conductor 220, switch blade 197, contacts 199, 201, 203 and 200, switch blade 198, and conductors 221, 216 and 217. It will be noted that in the circuit to the booster coil 34 just traced, the contacts 199, 201, 203 and 200 are included in series.

As soon as the motor 140 is placed in operation, the cam 205 is revolved. In the case of the motor circuit traced in the above paragraph, the rotation of the shaft 20 is in a clockwise direction so that the cam 205 rotates in a clockwise direction. This clockwise rotation of the cam 205, as previously explained, causes the switch blade 187 to move the contact 192 into engagement with the contact 190. Just prior to this engagement being effected, the contact 203 is moved out of engagement with the contact 200. The separation of the contact 203 from the contact 200 results in the interruption of the previously traced circuit to the booster coil 34 so that the relay is now free to move to its neutral position as soon as the energization of the coils 31 and 32 is the same. When contact 192 moves into engagement with the contact 190, the following circuit to the motor 140 is established: from the left-hand terminal of transformer 56 through conductors 208 and 222, switch blade 187, contacts 192 and 190, switch blade 185, conductors 223 and 212, limit switch 81, conductors 213 and 214, terminal 141, motor 140, terminal 142 and conductors 215, 216 and 217 to the other terminal of the transformer 56. It will be noted that this circuit is to the same terminals of the motor 140 as the circuit previously traced but is independent of the relay switch blade 36 and contact 37. The result is that the motor will continue to revolve until the notched portion 206 again is adjacent to the end of the extended portion 195 of the switch blade 187. If at this time the movement of the rebalancing potentiometer by the motor has caused a rebalance in the energization of the relay coils 31 and 32, the motor will stop. If switch blade 36 is still in engagement with the contact 37, the cycle just traced will be repeated. The result is that the booster coil is periodically deenergized and the motor is run on a maintaining circuit independent of the relay. The result is that the motor will normally be deenergized as a result of the separation of the contacts 190 and 192. Since these contacts are driven by the motor 140, they can be contacts of large current carrying capacity and have considerable pressure applied thereto. Because of this, the possibility of any harmful sparking between the contacts is minimized.

When the relay becomes unbalanced in the other direction as to cause switch blade 36 to engage the contact 38, a circuit will be established to the motor 140 as follows: from the left-hand terminal of transformer 56, through conductors 208, 209 and 210, switch blade 36, contact 38, conductors 225 and 226, limit switch 82, conductors 227 and 228, terminal 143, motor 140, terminal 142, and conductors 215, 216 and 217. The establishment of this circuit causes the motor to rotate in the opposite direction so that the valve is moved towards closed position, the shaft 18 is moved in a clockwise direction, and the shaft 20 in a counter-clockwise direction.

The engagement of the switch blade 36 with the contact 38 also results in the establishment of the following circuit to the booster coil 33: from the left-hand terminal of transformer 56, through conductors 208, 209 and 210, switch blade 36, contact 38, conductors 225 and 226, limit switch 82, conductors 227 and 230, booster coil 33, conductors 231 and 220, switch blade 197, contacts 199, 201, 203 and 200, switch blade 198 and conductors 221, 216 and 217 to the other terminal of transformer 56. It will be noted that the circuit to the booster coil 33, like the circuit to the booster coil 34, is through contacts 199, 201, 203 and 200 in series.

Upon the shaft 206 being revolved in a counter-clockwise direction as a result of the operation of the motor, the extended portion 195 of the switch blade 187 is deflected to the right to cause separation of the contacts 199 and 201. Immediately thereafter contacts 193 and 191 are moved into engagement. The separation of contacts 199 and 201 causes the deenergization of the booster coil 33 so that the relay is free to rebalance when relay coils 31 and 32 are equally energized. The engagement of contacts 193 and 191 results in the following circuit being established to the motor 140: from the left-hand terminal of transformer 56 through conductors 208 and 222, switch blade 187, contacts 193 and 191, switch blade 186, conductors 232 and 226, limit switch 82, conductors 227 and 228, terminal 143, motor 140, terminal 142, and conductors 215, 216 and 217 to the other terminal of transformer 56. This circuit, it will be noted, is independent of the relay so that the motor will continue in operation until the notched portion 206 is again adjacent the end of the extended portion 195 of the switch blade 187. If the relay is balanced at this time, the motor will stop. If not, the cycle will be repeated.

It will be noted that there is no possibility of the booster coil circuits being left in an open circuit position. This is due to the fact that the booster coil circuit is made immediately following the separation of the maintaining circuit contacts. While these contacts are remade while the motor may still be coasting slightly, the closing of these contacts will not unbalance the relay if the relay switch blade has moved to its neutral position in the meantime. This is due to the fact that the booster coil circuits are through the relay contacts.

The system of Figure 3 thus provides an arrangement whereby the starting of the motor is energized by a relay provided with ample booster action which is removed as soon as the motor is started. Furthermore, the stopping of the motor is under the control of relatively heavy contacts which are positioned by the motor itself. The result is that the system is much more sensitive than prior art systems and at the same time it is assured that the various contacts are never subjected to loads which they are not properly designed to carry.

While I have shown several embodiments of my invention for purposes of illustration, it is to be understood that the invention is limited only by the scope of the appended claims.

I claim as my invention:

1. In a motor control system, a motor, an electrically operated relay controlling the operation of the motor, said relay having winding means and armature means, said armature means being movable into and out of a motor operating position in accordance with the energization of said winding means, control means for varying the energization of said winding means, means operative upon said armature means being moved to said motor operating position to change the effective energization of said winding means in a direction to cause said armature means to assume more firmly said motor operating position, and means operated by said motor upon continuous unidirectional movement thereof periodically to restore the effective energization of said winding means to more nearly the value determined by said control means.

2. In a motor control system, a motor, an electrically operated relay controlling the operation of the motor and movable into and out of a motor operating position in accordance with the energization of said relay, control means for varying the energization of said relay, means operative upon said relay being moved to said motor operating position to change the effective energization of said relay in a direction to cause it to assume more firmly said motor operating position, and means operated by said motor periodically to energize said relay in a manner to oppose the change in the energization thereof introduced by said previously named means.

3. In a motor control system, a motor, an electrically operated relay controlling the operation of the motor and movable into and out of a motor operating position in accordance with the energization of said relay, control means for varying the energization of said relay, means operative upon said relay being moved to said motor operating position to change the effective energization of said relay in a direction to cause it to assume more firmly said motor operating position, and means including a snap switch operated by said motor effective upon continuous unidirectional movement of said motor to periodically restore the effective energization of said relay to more nearly the value determined by said control means.

4. In a motor control system, a motor, an electrically operated relay controlling the operation of the motor and movable into and out of a motor operating position in accordance with the energization of said relay, control means for varying the energization of said relay, means operative upon said relay being moved to said motor operating position to change the effective energization of said relay in a direction to cause it to assume more firmly said motor operating position, and means including a snap switch periodically moved by said motor from a first normal circuit controlling position to a second circuit controlling position, said switch when so moved immediately moving back to said first position independently of said motor, said last named means being operative each time that said snap switch moves to said second position to restore the effective energization of said relay to more nearly the value determined by said control means.

5. In a motor control system, an electrical motor, an electrically operated relay controlling the energization of said motor, said relay comprising coil means and contacts the spacing of which is varied in accordance with the energization of said coil means, said coil means comprising a main portion and a booster portion, control means for varying the energization of the main portion of said coil means, means operative upon said relay contacts being moved into engagement to energize the booster portion of said coil means in such a manner as to increase the contact pressure between said contacts, and means operated by said motor upon continuous unidirectional movement thereof alternately to energize and deenergize effectively the booster portion of said coil means, said last-named means operating so as to make the periods of effective deenergization short as compared to the periods of energization.

6. In a motor control system, an electrical motor, an electrically operated relay controlling the energization of said motor, said relay comprising coil means and contacts the spacing of which is varied in accordance with the energization of said coil means, said coil means comprising a main portion and a pair of mutually opposing booster portions, control means for varying the effective energization of the main portion of said coil means, means operative upon said relay contacts being moved into engagement to energize one of said booster portions to increase the contact pressure between said contacts, and means operated by said motor periodically to energize the opposing booster portion of said relay.

7. In a motor control system of the follow-up type, a reversible motor, an electrically operated relay controlling the operation of said motor and movable into and out of either of two motor operating positions in accordance with the energization of said relay, a variable control impedance controlling the energization of said relay, a variable follow-up impedance positioned by said motor and controlling the energization of said relay, means operative upon said relay being moved to either of said motor operating positions to change the effective energization of said relay in a direction to cause it to assume more firmly said motor operating position, and means operated by said motor after an initial movement thereof in either direction to restore the effective energization of said relay to more nearly the value determined by said control and follow-up impedances.

8. In a motor control system of the follow-up type, a reversible motor, an electrically operated relay controlling the operation of said motor and movable into and out of either of two motor operating positions in accordance with the energization of said relay, a variable control impedance controlling the energization of said relay, a variable follow-up impedance positioned by said motor and controlling the energization of said relay, means operative upon said relay being moved to either of said motor operating positions to change the effective energization of said relay in a direction to cause it to assume more firmly said motor operating position, and means operated by said motor upon continuous movement thereof in either direction periodically to restore the effective energization of said relay to more nearly the value determined by said control and follow-up impedances.

9. In a motor control system of the follow-up type, a reversible motor, an electrically operated relay controlling the operation of said motor and movable into and out of either of two motor operating positions in accordance with the energization of said relay, a variable control impedance controlling the energization of said relay, a variable follow-up impedance positioned by said motor and controlling the energization of said relay, means operative upon said relay being moved to either of said motor operating positions to change the effective energization of said relay in a direction to cause it to assume more firmly said motor operating position, and means operated by said motor upon continuous movement thereof in either direction periodically to energize said relay in a manner to oppose the change in the energization thereof introduced by said previously named means.

10. In a motor control system of the follow-up type, a reversible motor, an electrically operated relay controlling the operation of said motor and movable into and out of either of two motor operating positions in accordance with the energization of said relay, a variable control impedance controlling the energization of said relay, a variable follow-up impedance positioned by said motor and controlling the energization of said relay, means operative upon said relay being moved to either of said motor operating positions to change the effective energization of said relay in a direction to cause it to assume more firmly said motor operating position, means operated by said motor after an initial movement thereof in either direction to restore the effective energization of said relay to more nearly the value determined by said control and follow-up impedances, and means for periodically maintaining said motor in operation independently of said relay after said motor has been started.

11. In a motor control system of the follow-up type, a reversible motor, an electrically operated relay controlling the operation of said motor and movable into and out of either of two motor operating positions in accordance with the energization of said relay, a variable control impedance controlling the energization of said relay, a variable follow-up impedance positioned by said motor and controlling the energization of said relay, means operative upon said relay being moved to either of said motor operating positions to change the effective energization of said relay in a direction to cause it to assume more firmly said motor operating position, and switching means periodically operated by said motor through a predetermined cycle whenever said motor is operated in either direction, said switching means being operative during each cycle to first cause the effective energization of said relay to be restored to more nearly the value determined by said control and follow-up impedance and to then cause said motor to be operated independently of said relay.

12. In a motor control system, a rotary electric motor, a device positioned thereby, a reduction gear train between said motor and said positioned device, an electrically operated relay controlling the energization of said motor, said relay having winding means and armature means, said armature means being movable into and out of a motor energizing position in accordance with the energization of said winding means, control means for varying the energization of said winding means, means operative upon said armature means being moved to said motor energizing position to change the effective energization of said winding means in a direction to cause said armature means to assume more firmly said motor energizing position, and means including a switch and actuating means therefor connected to said gear train at an intermediate point thereof, said last named means being effective upon initial rotation of said motor to restore the effective energization of said winding means to more nearly the value determined by said control means.

13. In a motor control system, a rotary electric motor, a device positioned thereby, a reduction gear train between said motor and said positioned device, an electrically operated relay controlling the energization of said motor and movable into and out of a motor energizing position in accordance with the energization of said relay, control means for varying the energization of said relay, means operative upon said relay being moved to said motor energizing position to change the effective energization of said relay in a direction to cause it to assume more firmly said motor energizing position, and means including a switch and actuating means therefor connected to said gear train at an intermediate point thereof, said last named means being effective periodically to restore the effective energization of said relay to more nearly the value determined by said control means and to operate the motor independently of said relay.

14. In a motor control system, a motor, an electrically operated relay controlling the operation of the motor and movable into and out of a motor operating position in accordance with the energization of said relay, control means for varying the energization of said relay, means operative upon said relay being moved to said motor operating position to change the effective energization of said relay in a direction to cause it to assume more firmly said motor operating position, and means operating concurrently with said motor for periodically causing a change in the energization of said relay opposite to and of greater magnitude than that introduced by said previously named means.

JOHN L. HARRIS.